Aug. 9, 1966 S. JANUS 3,265,273
MACHINE FOR FEEDING AND SETTING FASTENERS
Filed May 11, 1964 6 Sheets-Sheet 1

INVENTOR
STANLEY JANUS
BY George N. Riches
ATTORNEY

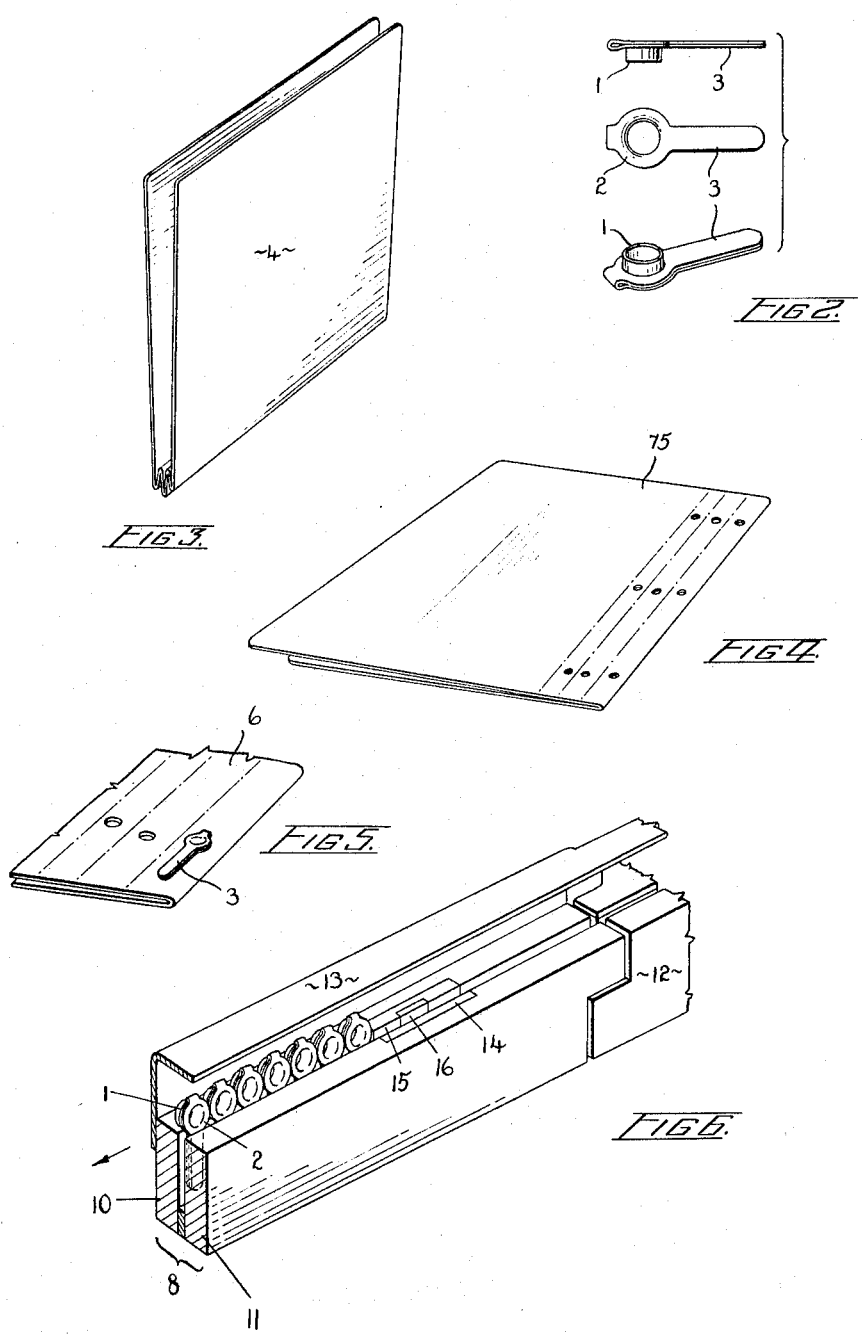

Aug. 9, 1966
S. JANUS
3,265,273
MACHINE FOR FEEDING AND SETTING FASTENERS
Filed May 11, 1964
6 Sheets-Sheet 3
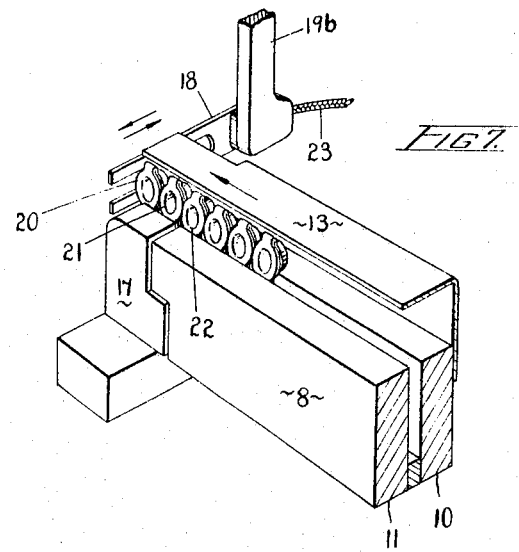
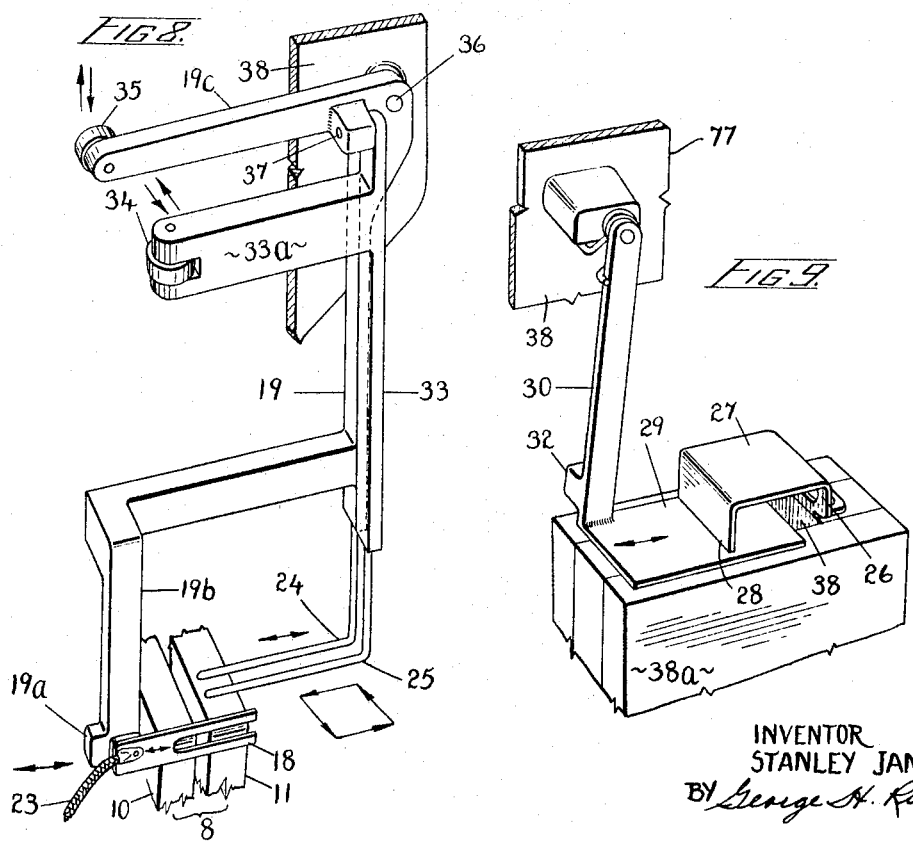
INVENTOR
STANLEY JANUS
BY George H. Riches
ATTORNEY Aug. 9, 1966     S. JANUS     3,265,273
MACHINE FOR FEEDING AND SETTING FASTENERS
Filed May 11, 1964     6 Sheets-Sheet 4
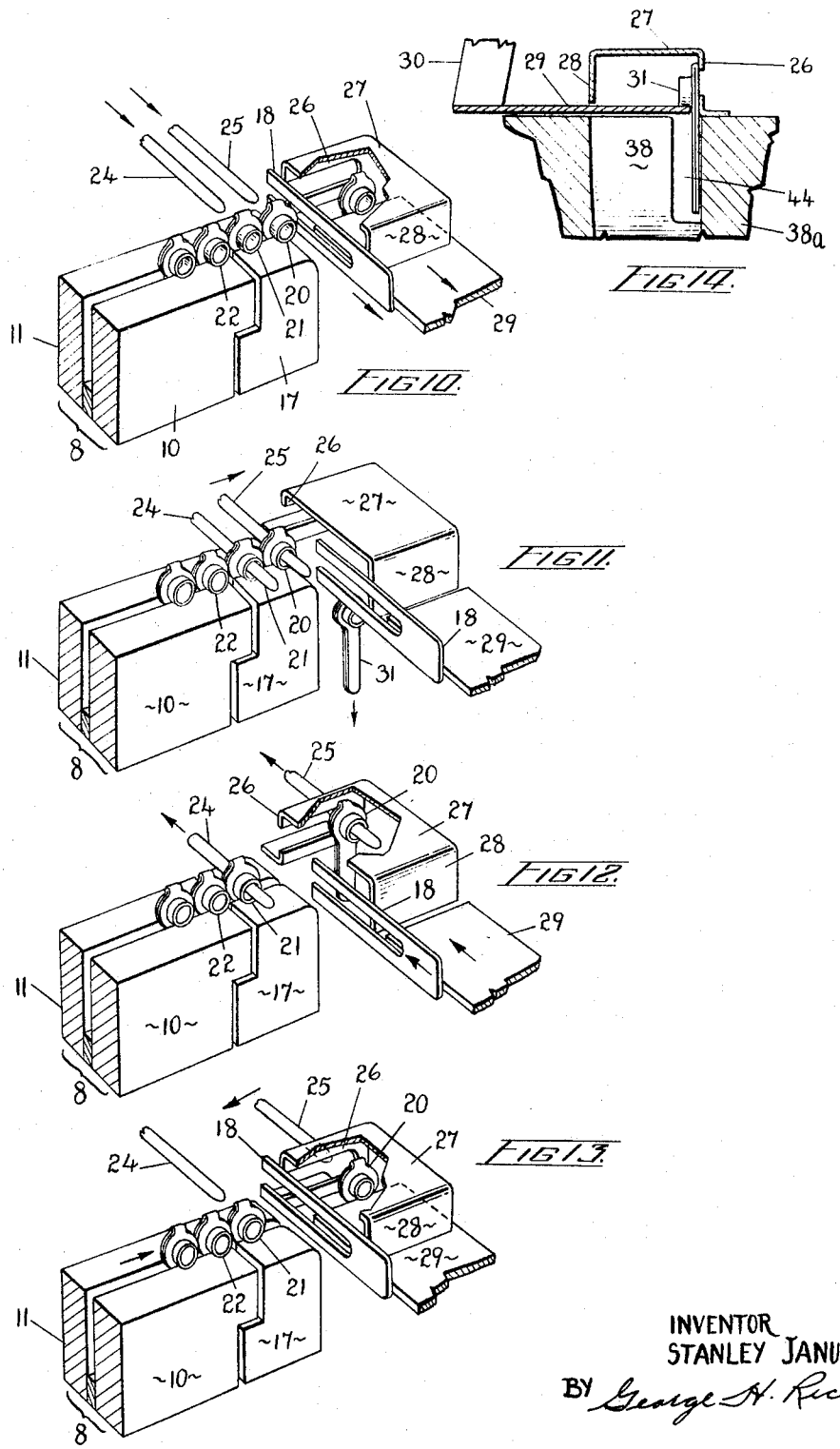
INVENTOR
STANLEY JANUS
BY George H. Riches
ATTORNEY

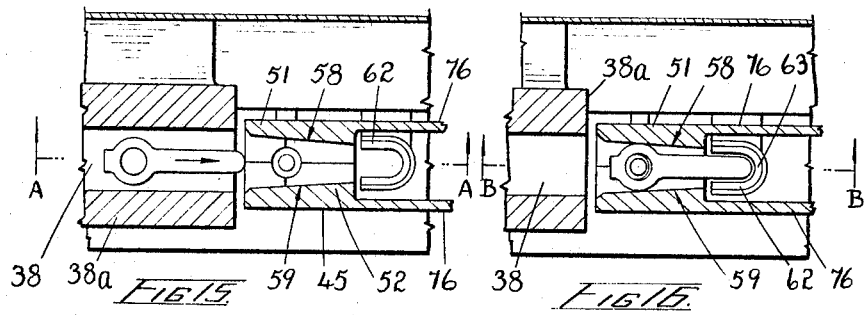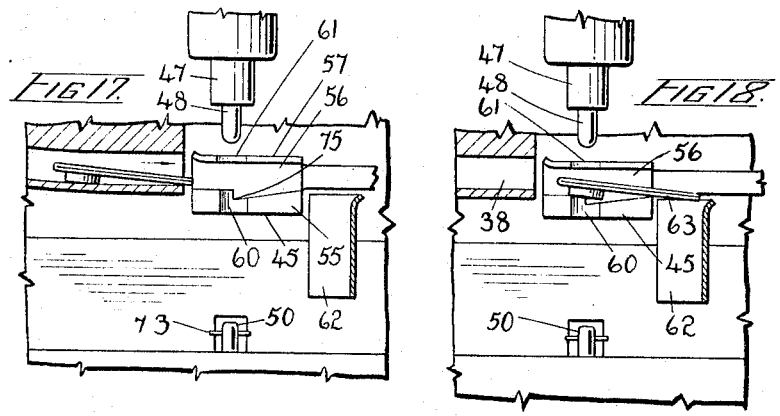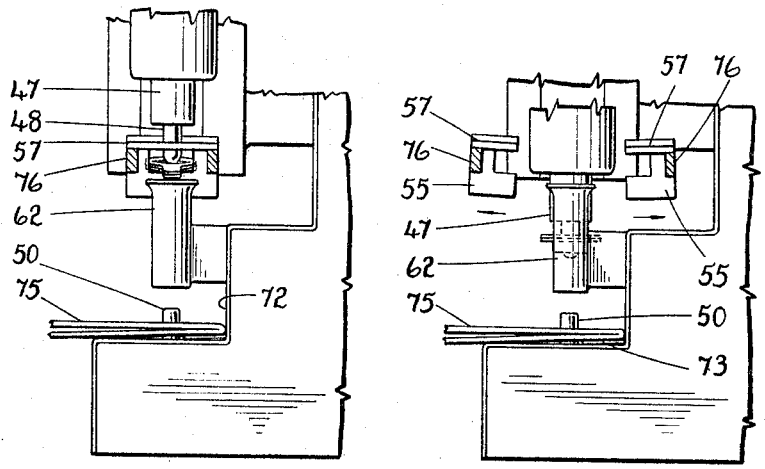

United States Patent Office 3,265,273
Patented August 9, 1966

3,265,273
MACHINE FOR FEEDING AND SETTING FASTENERS
Stanley Janus, Toronto, Ontario, Canada, assignor of a one-half interest to Index Card Company Limited, Toronto, Ontario, Canada, a corporation of Ontario
Filed May 11, 1964, Ser. No. 366,402
17 Claims. (Cl. 227—2)

This invention relates in general to a machine for setting fasteners in work-pieces and more specifically to a machine for setting tang fasteners or the like in single or multiple sheets of paper, plastic or other types of similar work-pieces.

One of the major faults with prior machines in this general field has been, that while a single operator could work one machine, it was found that in order to facilitate and speed up production, two operators per machine were required.

It is an object of this invention to provide, in a fastener setting machine, means for automatically feeding the fasteners from a hopper to setting tools to eliminate the necessity of a second operator for each machine.

Another object of the invention is to provide means for correctly orienting the fasteners relative to the work-piece and means to maintain the fasteners in a correct attitude during the setting operation.

A further object of the invention is to provide a machine which will ensure substantial uniformity in the actual setting of the fasteners with respect to a specific edge of a work-piece during setting to eliminate waste due to improper orienting of fasteners relative to an associated work-piece.

Using an automatic machine of the present invention, a single operator only is required and fasteners can be fed, positioned and set at more than three times the rate possible with the hand feeding and positioning methods. Efficiency is further increased by the substantial elimination of rejects due to human error induced by fatique and consequent failure of the operator, under the old methods, to properly orient each and every fastener.

The embodiment chosen to particularly and distinctly describe the essence or substance of the invention comprises a machine for automatically feeding, orienting and delivering tang fasteners for setting in the well known tang covers. However, it will be appreciated by those skilled in the art that obvious modifications may readily be made to the described and illustrated machine to effect automatic feeding, orienting and delivery of other similar types of fasteners for setting in other stationary items. Further, while the tang covers to be described hereinbelow are shown as having prepunched tang receiving holes, it is quite obvious that the said tang covers or other work-pieces could be introduced into a guide and positioning means adjacent the tang setting tools and that the setting tools could be used to perform the dual function of punching the necessary fastener-receiving holes and setting the fasteners therein.

A further modification, clearly envisaged and remaining within the scope and spirit of the invention to be more fully described herein resides in adapting the machine to position and set a plurality of fasteners per machine cycle.

The invention will be readily understood from the following detailed description taken in conjunction with the appended drawings wherein:

FIGURE 2 illustrates a tang of the type used in the machine herein described.

FIGURE 3 illustrates a tang cover.

FIGURE 4 shows a tang cover prior to setting of tangs therein.

FIGURE 5 shows a portion of a tang cover with one tang set in position.

FIGURE 6 is a perspective view of a portion of the storage track with sensing device.

FIGURE 7 is a view showing the relationship between the stationary track and the escapement gate.

FIGURE 8 is a view showing the arms which effect movements of the escapement.

FIGURE 9 shows the arm which effects operation of the chute gate.

FIGURES 10 to 13 show the escapement mechanism in various stages of operation.

FIGURE 14 shows the tang stabilizing mechanism, in a side view of the top end of the chute in section.

FIGURES 15 and 16 are plan views of the tang cradle.

FIGURES 17 and 18 are views showing the cradle taken along lines A—A and B—B of FIGURES 15 and 16 respectively.

FIGURE 19 is an end view of the cradle with the punch pilot engaging a tang.

FIGURE 20 illustrates the opening motion of the tang cradle.

Figure 1:
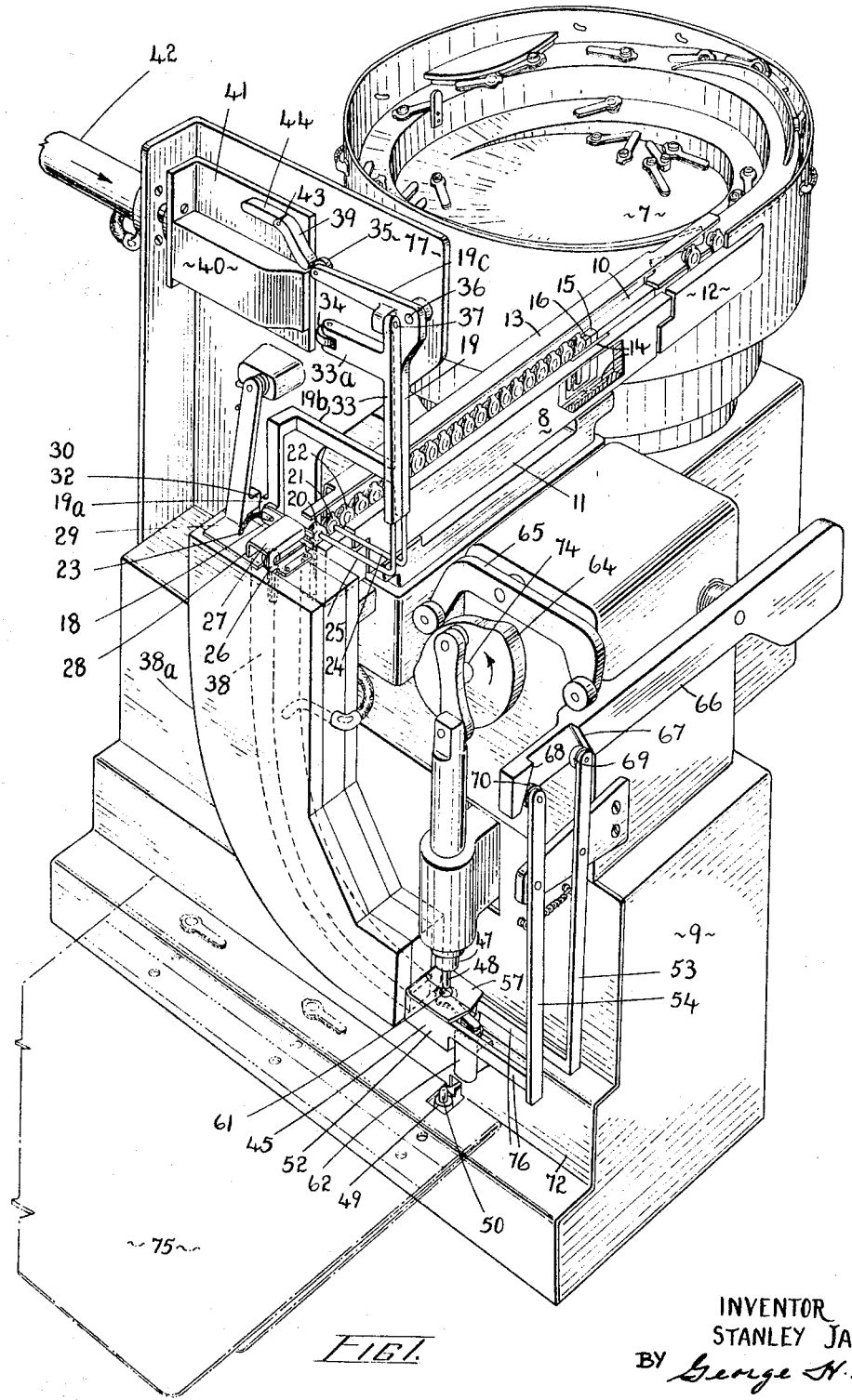
FIGURE 1 is a perspective view of the assembled machine.

With reference to the drawings and in particular FIGURE 2, thereof, a tang such as those used in the preferred embodiment of the invention herein described is shown as having a ferrule 1, an annular flange or collar 2, together defining an eyelet portion, and a tail portion 3.

Numeral 4 designates a tang cover (FIGURE 3) of the type referred to herein while FIGURE 4 shows a tang cover 75 prior to the setting of tangs therein.

With reference to FIGURE 5, a portion of a tang cover is shown with preformed holes in the binding portions 6 and one eyelet in position.

TANG FEEDING AND STORING MECHANISMS

The tang setting machine consists essentially of a bowl type vibratory feeder comprising a tang hopper and feeder 7 (FIGURE 1), and a combined track type, reciprocating vibratory feeder and storage track 8 together with other accessories for automatically conveying tangs from the feeder to the setting tools and further includes a press 9 (FIGURE 1) with tooling and drive.

In the embodiment of the machine shown in FIGURE 1 a vibratory parts feeder of bowl type 7, is used, but of course parts feeders of other designs may be used equally well. The purpose of the feeder is to orient tangs on a track and propel them along it.

An ascending spiral track on the perimeter of the bowl has tooling for orienting the tangs. This spiral track at the outlet of the bowl terminates in a piece of straight track 12, called a "tangent track."

The vibratory storage track is formed by two interconnected rails 10 and 11 (FIGURE 6), having a vertical slot between them of such a width that the tail of a tang will drop freely into it while the ferrule 1 of the tang (FIGURE 2) engages with one of the top edges of the slot. The edge of the rail on which the ferrule engages must be smooth and horizontal so that the tangs will be propelled along the tracks by vibratory movement. The ferrules of all tangs in the track must face to the same side of the track, which, on the described machine, is to the right looking in the direction of travel of the tangs. The tangent track 12 and storage track 8 (FIGURE 6) vibrate independently of each other, therefore a gap is provided between their adjacent ends. The carrying edges of the two tracks are at substantially the same level. To prevent tangs from falling out sideways through the gap between the two tracks, the adjacent ends of the tracks are in step form, as clearly seen in FIGURE 6. The function of this is to provide overlapping tracks to hold the tail of the tang in a continuous narrow slot so that it cannot turn or fall out when the ferrule of the tank is crossing the gap. An alternative of this last mentioned expedient is to provide a length of stationary track below the joint of the top edges, this stationary track being meant only to prevent the tail of the tang from turning. The track has a roof 13 (FIGURE 6) to prevent tangs from jumping up and out.

The feeding rate of tangs from the bowl is irregular and only the average rate can be controlled with any degree of accuracy. The feeding rate of the bowl running continuously is set higher than the highest predicted production rate. When the storage track 8 is full of tangs, the bowl feeder is automatically stopped for a period.

A device to sense when the storage track is full of tangs is built into the track and gives an electric signal when this happens controlling operaion of the rotary vibrator feeder. The device shown on FIGURE 6 consists of two insulating inserts 14 and 15 on opposite sides of the slot and a stainless steel electrode 16 in one of the inserts, all mounted flush with the top edges and internal surfaces of the slot in order to preclude obstruction of the flow of tangs. The lower end of the electrode 16 leads outside part 10 of storage track. The electrode is on the side of the track on which the ferrules of tangs are riding. The electric circuit between the insulated electrode and the rest of the steel track (which is grounded) is shorted only when at least two tangs, touching each other, short the electrode to the track which can happen only when the track is full of tangs.

The discharge end of the storage track is connected to a piece of stationary track 17 (FIGURE 7). The joint between the two is effected in the same manner as between the storage track and the tangent bowl track. The stationary track can hold only two tangs and a tang can enter the stationary track 17 only if there is a number of tangs upstream from it to push it forward. On the end of the stationary track 17, above and across it, is a retractable stop member or escapement gate 18 (FIGURE 7) which, in closed position, as shown, prevents the tangs from leaving the track. The escapement gate is part of an escapement mechanism which is not included in FIGURE 7. Escapement gate 18 retracts in the direction shown in FIGURE 7 to allow one tang to pass to the chute.

The stationary piece of track 17 serves two purposes:

(1) The two tangs 20 and 21 (FIGURE 7) "sitting" in the stationary track are "handled" by the escapement mchanism and the latter has been found more reliable when the tangs to be handled are not subject to vibration.

(2) For efficient operation of the escapement mechanism the two tangs 20 and 21 upstream from the gate 18 must be in correct positions, that is the first tang 20 must be touching both the gate 18 and the next tang 21 upstream. The escapement gate 18 is electrically insulated from the arm 19 which carries it and also from ground. It is connected by a wire 23 to an electric control box. The stationary track is of an electrically insulating material. When the discharge end of the track is filled with tangs, the first three tangs 20, 21 and 22 close the electric circuit between escapement gate 18 and vibratory storage track 8, thus supplying an electric signal to the machine controls. In the absence of this signal the escapement mechanism will not operate.

ESCAPEMENT MECHANISM

The escapement mechanism serves the purpose of removing one tang at a time from the discharge end of the storage track. It is visible above the chute 38 on FIGURE 1 and its principle of operation is shown on FIGURES 10 to 14 inclusive. Parts of the escapement which "handle" the tangs are shown on FIGURE 10 and they are five in number, as follows: a hold back pin 24, a transfer pin 25, an escapement gate 18, an escapement stripper 26, and a knock-down plate 27 (FIGURE 1 also). On the same FIGURE 10 are shown chute gate 29 and chute stripper 28 which, together with their actuating arm 30, form a tang stabilizing device, shown on FIGURES 14 and 9.

Escapement stripper 26, knock-down plate 27 and chute stripper 28 are stationary, while hold back pin 24, transfer pin 25, escapement gate 18 and chute gate 29 execute motions shown by arrows on FIGURES 10 to 13 inclusive. These "handling" parts 24, 25, 18 and 29 are attached to arms 19, 33, 19b and 30 respectively, FIGURES 8 and 9, which effect the required motions. Discharge of one tang from the track takes place during one complete cycle of motions of the escapement parts. The cycle can be broken down into 4 steps, the beginning of each step being shown on FIGURES 10 to 13. By "step" is means the transition from the state shown on one figure to the state shown on the next successive figure. The functions which take place in each step are as follows:

*Step 1* (FIGURE 10).—At the beginning of the cycle the escapement gate must be electrically grounded by a tang in contact therewith, otherwise the mechanism will not start. Initially the transfer pin 25 and hold back pin 24 enter the holes in the first and second tangs, 20 and 21, respectively. Escapement gate 18 retracts after the first tang 20 has been picked up. Chute gate 29 retracts simultaneously and dislodges tang 31 sitting on the edge of the chute gate to let it fall down the chute. If tang 31 is carried by the chute gate, chute stripper 28 will force it to fall down.

*Step 2* (FIGURE 11).—Tang 20 is carried forward by transfer pin 25, the latter entering a slot in the escapement stripper 26. During transfer, and due to sudden initiation of movement, the tail of the tang may jump up above the transfer pin, the purpose of the knock-down plate 27 being to knock it down, if such happens.

*Step 3* (FIGURE 12).—The hold back in pin 24 and transfer pin 25 withdraw and tang 20 is stripped off the latter. Escapement gate 18 closes again before tang 21 is released from the hold back pin. Chute gate 29 closes and its edge registers under the ferrule of tang 20 while the latter is still hanging on the transfer pin, so that when the transfer pin is completely withdrawn, the tang 20 hangs on the edge of chute gate by its ferrule. The tail of the tang is not pinched between the chute gate and escapement stripper 26, so that it can assume a vertical position due to the force of gravity. Therefore it will not jam in the chute when falling down in the next cycle.

*Step 4* (FIGURE 13).—The transfer pin 25 returns to its starting position as in FIGURE 10, passing through a slot in the end of escapement gate 18. Tangs 21 and 22 (and all other tangs in the track) are now free to advance until they are arrested by the escapement gate. All parts of the escapement are now restored to their starting positions and a new cycle can be initiated.

In the escapement system just described a tang is dropped into the chute tail first. The machine can, however, work equally well if the tang is turned upside down by the mechanism and dropped into the chute "eyelet portion" first by suitable re-arrangement of parts.

ESCAPEMENT DRIVE MECHANISM

Arms which carry on their respective ends the handling parts of the escapement are shown on FIGURE 8. Arm 19 carries hold back pin 24 and the arm extension 19b on which is mounted the escapement gate 18. The arm 19 is pivoted on axis 36 to the machine frame 77, the axis of the pivot being parallel to the vibratory storage track 8 (FIGURE 8). As a result, arm 19 swings in a plane at right angles to the track. Arm 19 has an extension 19c with a roller 35 thereon which is moved up and down by a cam 39 (FIGURE 1) to produce the required motion of the handling parts. Transfer pin 25 is attached to arm 33 which is in turn pivoted to extension 19c on pivot pin 37, the axis of this pivot pin being at right angles to the storage track, that is at right angles to the axis of pivot 36. Thus, arm 33 can swing back with extension 19c around pivot 36 and it can swing independently from extension 19c around pivot pin 37. Arm 33 has an extension 33a with a roller 34 thereon which is operatively engaged by cam 40 (FIGURE 1) to produce motion of transfer pin 25 in the direction of the storage track. Return of arms 19 and 33 is effected by springs.

Cams 39 and 40 (FIGURE 1) are mounted on a slide 41 (FIGURE 1) which is moved by an air cylinder 42 horizontally in a direction at right angles to the storage track.

Figure 21:
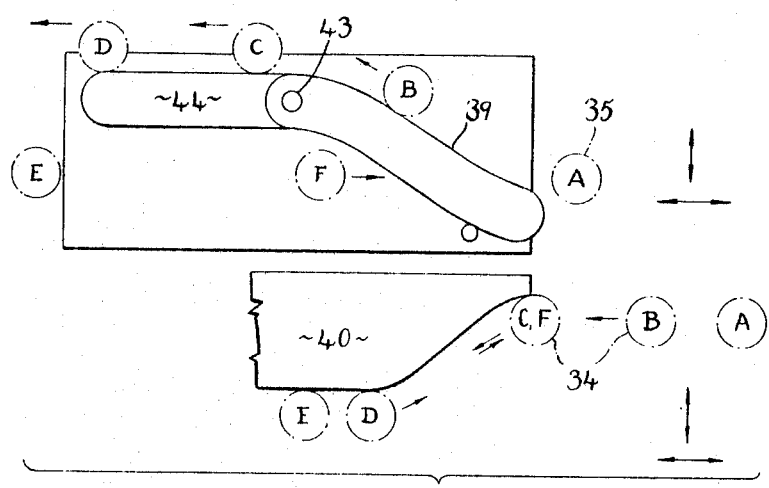
FIGURE 21 is a schematic representation of the relative movement between the escapement cam followers and cams.

FIGURE 21 represents diagrammatically the relative positions and motions of cams 39 and 40 and of the two rollers 34 and 35 co-acting therewith. The respective positions of the two rollers 34 and 35 are marked by the same letters A to E. Cam 39 (FIGURE 21) is hinged at pivot 43. Roller 35 after dropping down from horizontal fixed cam extension 44, returns underneath cam 39 by lifting it up; cam 39 snaps back down into place when roller 35 has passed under it. Positions of rollers 34 and 35 on FIGURE 21 marked by A correspond to positions of escapement parts as on FIGURE 10, position C corresponds to FIGURE 11, D to FIGURE 12 and E to FIGURE 13.

Chute gate 29 is attached to the end of arm 30 (FIGURE 9), the arm being pivoted to the machine frame. Arms 19 and 30 (FIGURES 1, 8 and 9) are mounted on the machine in such relative positions one with respect to the other that when escapement gate 18 opens, bumper 19a on the lower end of arm extension 19b engages projection 32 on arm 30 to open the chute gate 29. Return of arm 30 is effected by spring means or the like.

CHUTE

In the present embodiment, the transfer mechanism for delivering the tang to the tang compartment includes a curved tang chute 38 of rectangular cross section defined by the chute housing 38a (FIGURE 1). At the top end of the chute where the tang is discharged by the escapement mechanism the chute is substantially vertical as indicated at 44 (FIGURE 14). Further down, the chute curves towards a tang cradle 45 (FIGURE 1) terminating in a horizontal chute portion with an exit opening opposite and immediately adjacent to the entrance opening of the tang cradle (see FIGURES 15 and 17). The centerline of the exit opening of the chute intersects the centerline of the eyelet setting tools. When a tang is dropped into the chute the ferrule is facing in a direction away from the setting tools and the opening of the chute is narrow enough to prevent rotation of the tang about its longitudinal axis, so that the tang arrives at the exit of the chute with the ferrule facing down (FIGURE 17). An air jet may be provided to blow tangentially into the chute in the direction of the moving tang to increase delivery speed, if necessary.

TANG CRADLE

Tang cradle 45 (FIGURE 1) is a device for catching a tang as the latter emerges from the exit of the chute and for holding it in correct position between the eyelet setting tools as hereinafter described.

The tang cradle comprises two separate halves, 51 and 52 (FIGURE 15). The two halves of the cradle are symmetric with respect to a plane passing through the centerline of the eyelet setting tools and the middle of the chute exit. When the cradle opens, the two halves swing out at right angles to, and out of the said plane. FIGURE 15 represents a view from above the cradle with a tang in the end of the chute and approaching the cradle, whereas FIGURE 16 shows the tang positioned in the cradle.

Each of the two halves 51 and 52 of the cradle includes a bottom portion 55 (FIGURE 17), a side portion 56 and a top cover 57. Extensions of the cradle sides 76 (FIGURE 16), are attached to lower ends of a so called "scissors lever" 53 and 54 respectively (FIGURE 1). The surface on which a tang slides in the exit of the chute is slightly above the bottom of the opening of the cradle with a very small gap between the two so that a tang will encounter no obstruction when passing from the chute to the cradle.

When the cradle is closed, its bottom, sides and top cover form a compartment which is, in effect, a continuation of the chute exit. The vertical, internal side walls 58 and 59 (FIGURE 15) of the cradle halves are not parallel but inclined symmertically with respect to the centerline at an angle of about 2 degrees. The inclination of the cradle side walls has the effect of narrowing the compartment inside the cradle in the direction of travel of a tang, causing the tang to wedge itself between the side walls on the outside diameter of the tang collar. The bottom plates and top covers of the cradle have semi-circular cut outs on their edges which form holes 60 and 61 (FIGURE 18) when the tang cradle is closed. When tang 63 (FIGURE 18) is wedged in the cradle, the hole in the tang lines up with holes 60 and 61 in the bottom and cover, all holes being on the centerline of the eyelet setting tools. The wedging action is a very important feature of the cradle as it precludes the tendency of a tang to bounce out of position.

Because the tang enters the cradle tail first, the tail may drop into the hole 60 in the botom of the cradle and thus catch on the opposing side of the hole, causing the tang to bounce back before it is wedged. In order to prevent such an occurrence the downstream edge of the hole may be rounded or the bottom stepped down as shown at 75 on FIGURE 17. This step is through the center of the hole in the bottom and across the path of the tang. Downstream from the step the bottom gradually rises to the same level as that upstream of the step. The downstream of the end of the cradle is open both in the direction of travel of the tang and from underneath. When a tang is wedged in the cradle (FIGURE 18), its tail sticks out beyond the bottom 55 of the cradle. Immediately beneath the tip of the tail is a stationary tail guide 62 (FIGURE 18). The tail guide has a vertical trough in it, slightly wider than the width of a tang tail and placed in such a way that the tip of the tail, as a tang is being carried down by the punch pilot, is guided into and travels down the trough (see FIGURE 22). This arrangement ensures that the tang cannot rotate around the punch pilot 48 of the eyelet setting tools when being carried down and that the tails of tangs are always pointing in the same direction when set in the workpiece.

If it is desired that the escapement mechanism be modified such that a tang is dropped into the chute "eyelet portion" first, the cradle would work just as well. The tail guide in that case however would have to be placed on the upstream side of the cradle.

Figure 22:
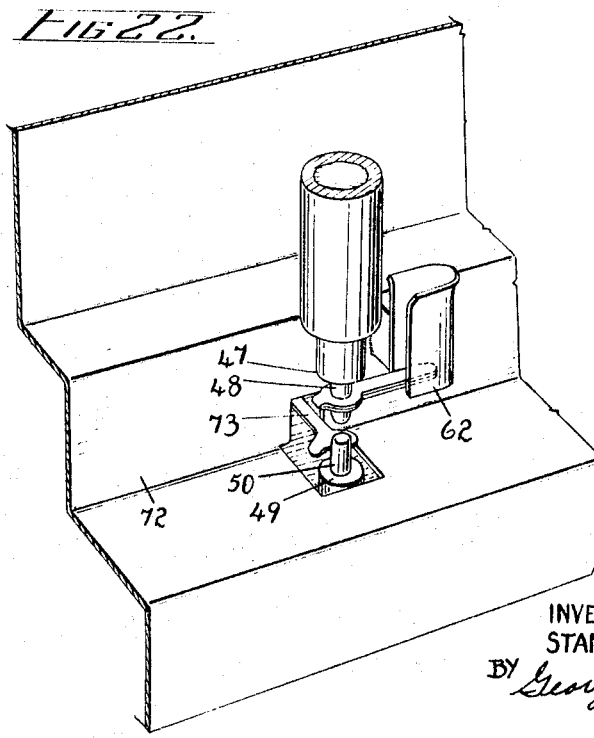
FIGURE 22 is a perspective view of the tang setting tools and work area.

The tools used for setting the tangs are standard tools used for setting eyelets, comprising a punch 47 with retractable, spring loaded pilot 48 (FIGURE 19) and a die 49 with a fixed pilot 50 (FIGURE 22).

When a machine is tripped as hereinafter described and the punch 47 descends, its pilot 48 passes first through the hole in the top cover 57 of the cradle and engages the hole in the tang (FIGURE 19), before the cradle opens (FIGURE 20), FIGURE 22 shows the same function as FIGURE 20, except that the tang cradle is not shown on the former. The punch stroke is faster than the rate of free fall of the individual tangs so that a tang cannot fall off the pilot 48.

Opening of the tang cradle 45 (FIGURE 1) is accomplished by two so called "scissors levers" 53 and 54 (FIGURE 1), each of which, on its low end, has half of the tang cradle attached thereto. Opening of the tang cradle is synchronized with the descent of the punch 47, as both actions are governed by crankshaft 74 of the punch press 9 (FIGURE 1). When the press clutch engages, disc cam 64 (FIGURE 1), mounted on the press crankshaft, pushes up one end of lever 65 which on its other end pushes down one end of pivoted arm 66, with cams 67, 68 attached to it. On the way down cams 67 and 68 move rollers 69 and 70 towards each other. Each of the said rollers is attached to the upper end of a pivoted scissors lever and when the upper ends of scissors levers are pushed towards each other, their lower ends swing apart thus opening tang cradle. Return motions of levers 65, 66, 53 and 54 are effected by springs.

Any other kind of tang cradle opening mechanism can be used instead of the described one, as long as opening and closing of the tang cradle is synchronized with the setting stroke. If the tang is not seated properly in the cradle when the press is tripped, the punch pilot 48 will not pick up said tang properly and damage to the setting tools may occur. To prevent this happening the bottom 55 of the cradle halves are made from electrically insulating material whereas the side walls 58 and 59 are metallic. The side walls are electrically insulated from each other and from the rest of the machine (not shown in the drawings).

When a tang is not wedged properly between the side walls, the electric circuit between the side walls is not closed and the press cannot be tripped.

Of course, it is not essential that the cradle be of a type which opens as herein described. Retractable unitary cradles and similar known types could be used with a minimum of modification to the embodiment herein illustrated and described.

OPERATION OF THE MACHINE

In using the machine the operator places a workpiece 75 (FIGURE 1) such as that shown in FIGURE 4, or similar, on the worktable of the machine, in such a way that a prepunched hole in the workpiece registers over the die 49 (FIGURE 1). If all holes are at the same distance from the edge of the workpiece, edge guide 72 (FIGURE 1) can be used to facilitate positioning of the workpiece. Next, the operator depresses the workpiece so that the die pilot 50 (FIGURE 1 and FIGURE 22) enters the said hole. This action depresses a feeler 73 (FIGURE 22), connected to a limit switch, tripping the latter, and thus engaging the press clutch. The said feeler cannot be depressed unless die pilot 50 has entered the hole in the workpiece. The press has a single revolution clutch whereby the press crankshaft makes only one full turn before the clutch disengages. During this one turn of the crankshaft, the punch descends, the cradle opens, a tang is set, the punch returns and the cradle closes. Simultaneously the press crankshaft trips another limit switch which puts the escapement mechanism through one complete cycle, during which one tang is dropped into the chute. By the time the falling tang reaches the cradle, the punch is up and the cradle is closed. Thus another tang is deposited in the cradle for the next cycle. The operator lifts the workpiece off the die and repeats process for another pre-punched hole in the workpiece.

From this description it will be obvious to those skilled in the art that changes and/or modifications may be made herein without departing from the spirit and scope of the invention.

What I claim as new and desire to protect by Letters Patent of the United States is:

1. In combination with an eyelet setting machine for fixing tangs to tang covers, said covers having preformed tang receiving holes in the binding edges thereof, mechanical means for delivering tangs one at a time to the eyelet setting tools of the eyelet setting machine in a preselected setting position, said mechanical means including a vibrator feeder mechanism for selecting, orienting and transporting said tangs to a tang transfer mechanism, said tang transfer mechanism feeding the tangs one at a time automatically into a tang compartment carried by the eyelet machine for automatic positioning of successive tangs relative to the eyelet setting tools and the binding edge of the cover to which the tang is to be attached; switch means actuated by the manual positioning of a tang cover with one hole of the binding edge in registering position with the eyelet setting tools whereby the tang in the compartment is released therefrom and fixed in position on a binding edge of the tang cover, said switch means simultaneously actuating said transfer mechanism to feed another tang to said tang compartment.

2. The combination as defined in claim 1 wherein said transfer mechanism includes a tang delivery chute having an inlet adjacent the terminus of the vibrator feeding mechanism in the same plane as the feeding mechanism, said delivery chute leading into the tang compartment; a retractable stop member positioned between the inlet and the said terminus; a pair of movable tang engaging members one of which serves as a tang transfer member and the other as a tang stop member; means simultaneously actuating the tang transfer member to transfer one tang to a position above the inlet and to release a previously transferred tang for delivery through the chute to the tang compartment and the tang stop member to arrest the movement of the tangs adjacent the retractable stop member during said transfer.

3. The combination as defined in claim 2 wherein said tang stop member includes a horizontal tang engaging prong and is pivotally mounted on a fixed portion of the machine for tang engaging and releasing movement in a direction at right angles to the path of travel of the tangs in the feeder mechanism; said tang transfer member also including a horizontal tang engaging prong and being pivotally mounted on said tang stop member for corresponding movement therewith and also movement in a direction along the path of travel of the tangs in the feeder mechanism.

4. In combination with an eyelet setting machine for fixing tangs to tang covers, said covers having preformed tang receiving holes in the binding edges thereof, mechanical means for delivering tangs one at a time to the eyelet setting tools of the eyelet setting machine in a preselected setting position, said mechanical means including a rotary vibrator feeder mechanism for selecting and orienting tangs and feeding same to an elongated reciprocating vibrator feeder mechanism; a slotted track means disposed between the rotary feeder mechanism and the reciprocating feeder mechanism and in close adjacency thereto, said slotted track means operable to pass the tangs from the rotary feeder mechanism to the reciprocating feeder mechanism in vertical position; a retractable tang stop member located at that end of the reciprocating feeder mechanism remote from said slotted track means and a tang transfer mechanism located adjacent said retractable tang stop member; said tang transfer mechanism operable to deliver the tangs one at a time into a tang compartment carried by the eyelet machine for automatic positioning of successive tangs relative to the eyelet setting tools and the binding edge of the cover to which the tang is to be attached; switch means actuated by manually positioning a tang cover with one hole of the binding edge in registering position with the eyelet setting tools whereby the tang in the tang compartment is released therefrom and fixed in position on a binding edge of the tang cover, said switch means simultaneously actuating said transfer mechanism to feed another tang to said tang compartment.

5. The combination as defined in claim 4 wherein said transfer mechanism includes a tang delivery chute having an inlet adjacent the terminus of the vibrator feeding mechanism in the same plane as the feeding mechanism, said delivery chute leading into the tang compartment; a retractable stop member positioned between the inlet and the said terminus; a pair of movable tang engaging members one of which serves as a tang transfer member and the other as a tang stop member; means simultaneously actuating the tang transfer member to transfer one tang to a position above the inlet and to release a previously transferred tang for delivery through the chute to the tang compartment and the tang stop member to arrest the movement of the tangs adjacent the retractable stop member during said transfer.

6. The combination as defined in claim 5 wherein said tang stop member includes a horizontal tang engaging prong and is pivotally mounted on a fixed portion of the machine for tang engaging and releasing movement in a direction at right angles to the path of travel of the tangs in the feeder mechanism; said tang transfer member also including a horizontal tang engaging prong and being pivotally mounted on said tang stop member for corresponding movement therewith and also movement in a direction along the path of travel of the tangs in the feeder mechanism.

7. The combination as defined in claim 4 wherein the said tang compartment comprises two sections pivoted about a common horizontal axis; a lever mechanism connected to each section and responsive to actuation of said switch means to swing apart said sections releasing a tang positioned in the compartment for attachment by said eyelet setting tools to a binding edge of the tang cover.

8. The combination as defined in claim 4 and further including sensing means in said elongated reciprocating vibrator feeder mechanism to sense when the reciprocating feeder mechanism is full of tangs and initiate a signal to temporarily halt operation of the rotary vibrator feeder mechanism, said sensing means comprising a pair of opposing insulating inserts mounted in the walls of the reciprocating feeder mechanism, one of said inserts having an electrode therein such that when the reciprocating feeder mechanism is full of tangs, contiguous tangs therein complete a circuit between the electrode and the feeder mechanism thus allowing a signal to be passed to a control circuit controlling operation of the rotary vibrator feeder mechanism.

9. The combination as defined in claim 4 and further including sensing means controlling operation of the tang transfer mechanism, said sensing means comprising an open electric circuit including an electrical connection extending from a tang transfer mechanism control means to the retractable stop member, said retractable stop member being insulated from ground; an electrically non-conducting fixed track portion positioned between the reciprocating feeder mechanism and said retractable stop member such that said open electric circuit is completed to ground only when a predetermined number of tangs in contact with each other bridge said electrically non-conducting fixed track portion and established an electrical path from the retractable stop member to ground through the reciprocating feeder mechanism thus rendering operable the tang transfer mechanism.

10. A machine for feeding and setting tang fasteners in work pieces, each tang fastener consisting of an eyelet portion and tail portion; said machine comprising, fastener storage means; means for propelling and orienting fasteners from said storage means to track means, said track means conveying fasteners in predetermined orientation from the orienting means to mechanical intermittent delivery means for intermittent delivery of single fasteners thereby to fastener holding and positioning means, said delivery means including at least one movable tang engaging pin, said pin being operable to intermittently engage a tang through the eyelet portion thereof to effect delivery of a tang.

11. A machine as defined in claim 10 wherein said fastener holding and positioning means consists of a cradle comprising two opposed relatively movable sections, each section having inner inclined walls operable to exert a releasable but firm wedging action on a tang transferred therebetween in predetermined orientation.

12. A machine for feeding and setting fasteners in workpieces, said machine comprising, fastener storage means, means for propelling and orienting fasteners from said storage means to track means, said track means comprising a substantially horizontal vibratory storage track and including a pair of parallel rails defining therebetween a narrow slot, said slot slidingly accommodating a depending portion of each fastener, said track means conveying fasteners in predetermined orientation from the orienting means to mechanical means for intermittent delivery of single fasteners thereby to fastener holding and positioning means, said fastener holding and positioning means being in operative adjacency to fastener setting tool means.

13. A machine as defined in claim 12 wherein said vibratory storage track means includes sensing means operable to determine when the track is full of fasteners and responsive at such time to arrest the means for propelling and orienting fasteners for a predetermined period of time.

14. A machine for feeding and setting fasteners in workpieces, said machine comprising, fastener storage means, means for propelling and orienting fasteners from said storage means to track means, said track means comprising a pair of substantially horizontal equidistant rails defining therebetween a narrow slot, said slot slidingly accommodating a depending portion of each fastener, said track means conveying fasteners in predetermined orientation from the orienting means to mechanical means for intermittent delivery of single fasteners thereby to fastener holding and positioning means located in operative adjacency to fastener setting tool means, said mechanical means including an escapement mechanism comprising a fastener hold-back member and a fastener transfer member, said mechanical means further including an escapement gate member and means for actuating said members to arrest movement of the fasteners in the track means, to transfer a single fastener to delivery means and to simultaneously retract and return said escapement gate respectively.

15. A machine as defined in claim 14 wherein the said fastener hold-back member and fastener transfer member comprise pins operatively engageable with said fasteners.

16. A machine as defined in claim 14 including an electrical escapement control circuit, said track means and said escapement gate member forming part of said control circuit; the track means being electrically conductive and the escapement gate member being electrically insulated from said track means such that the control circuit is actuated only when contiguous fasteners electrically interconnect the track means and the escapement gate member.

17. A machine as defined in claim 14 wherein the actuating means includes a pair of arm members; said fastener hold-back member and escapement gate member being rigidly attached to one of said arm members, the latter being rotatably connected to a fixed frame portion of the machine frame for oscillating motion about a first axis parallel to the track means; said transfer member being rigidly attached to the other arm member of said pair which is rotatably connected to said one arm member about a second axis at right angles to said first axis, and drive means operable to oscillate said arm members about the first and second axes.

References Cited by the Examiner
UNITED STATES PATENTS

| | | | |
|---|---|---|---|
| 579,148 | 3/1897 | Hay | 227—115 |
| 1,506,788 | 9/1924 | Stimpson | 227—116 |
| 1,835,507 | 12/1931 | Lipps | 227—119 X |
| 1,862,651 | 6/1932 | August et al. | 227—6 X |
| 2,621,824 | 12/1952 | Gookin | 227—119 X |
| 2,884,634 | 5/1959 | Weiner | 227—6 X |

GRANVILLE Y. CUSTER, JR., *Primary Examiner.*